United States Patent
Barthel et al.

(10) Patent No.: US 7,014,975 B2
(45) Date of Patent: Mar. 21, 2006

(54) SOLIDS SURFACE-MODIFIED WITH AMINO GROUPS

(75) Inventors: Herbert Barthel, Emmerting (DE); Mario Heinemann, Burghausen (DE); Bernd Pachaly, Mehring (DE); Andreas Bauer, Munich (DE); Oliver Schaefer, Munich (DE)

(73) Assignee: Wacker-Chemie GmbH, Munich (DE)

( * ) Notice: Subject to any disclaimer, the term of this patent is extended or adjusted under 35 U.S.C. 154(b) by 343 days.

(21) Appl. No.: 10/259,057

(22) Filed: Sep. 27, 2002

(65) Prior Publication Data

US 2003/0099895 A1 May 29, 2003

(30) Foreign Application Priority Data

Oct. 18, 2001 (DE) .......................... 101 51 478

(51) Int. Cl.
*G03G 9/08* (2006.01)

(52) U.S. Cl. .................. 430/119; 430/110; 427/212; 428/413; 428/446; 428/689

(58) Field of Classification Search ............. 430/119, 430/110; 427/212; 428/413, 446, 689
See application file for complete search history.

(56) References Cited

U.S. PATENT DOCUMENTS

| | | |
|---|---|---|
| 3,868,345 A | 2/1975 | Kratel et al. |
| 3,953,487 A | 4/1976 | Kratel et al. |
| 4,584,393 A | 4/1986 | Webb et al. |
| 4,981,988 A | 1/1991 | Ichinohe et al. |
| 5,458,916 A | 10/1995 | Kratel et al. |
| 5,776,240 A | 7/1998 | Deller et al. |
| 6,022,404 A | 2/2000 | Ettlinger et al. |
| 6,183,867 B1 | 2/2001 | Barthel et al. |
| 6,413,490 B1 | 7/2002 | Gilges et al. |
| 6,752,864 B1 | 6/2004 | Meyer et al. |
| 2002/0042491 A1 | 4/2002 | Brader et al. |
| 2002/0168524 A1 | 11/2002 | Kerner et al. |

FOREIGN PATENT DOCUMENTS

| | | |
|---|---|---|
| DE | 3546376 | 7/1986 |
| DE | 3902483 | 9/1989 |
| DE | 4234846 | 4/1994 |
| DE | 19756831 | 7/1999 |
| EP | 0 722 992 | 7/1996 |
| EP | 1 078 883 | 2/2001 |
| EP | 0 725 037 | 3/2001 |
| EP | 1 138 724 | 10/2001 |
| EP | 1195379 | 4/2002 |
| EP | 1201669 | 5/2002 |
| EP | 1 236 773 | 9/2002 |
| EP | 1 266 864 | 12/2002 |

OTHER PUBLICATIONS

Derwent Abstract corresponding to DE 4234846 [AN 1994–136716].

Primary Examiner—Samuel Barts
(74) Attorney, Agent, or Firm—Brooks Kushman P.C.

(57) ABSTRACT

Surface-modified solids bearing groups of the formula I

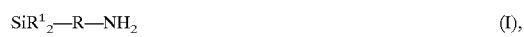

are prepared by reacting a solid having OH groups on a surface thereof with a cyclic silazane of the general formula II

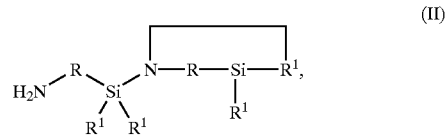

where
R is a divalent optionally substituted hydrocarbon radical optionally containing heteroatom containing groups, and
$R^1$ is a hydrogen atom, or a monovalent optionally substituted hydrocarbon or hydrocarbonoxy group optionally containing heteroatom-containing groups. The surface-modified solids are preferably metal oxide particles. Such surface-modified particles are useful in numerous products.

13 Claims, No Drawings

SOLIDS SURFACE-MODIFIED WITH AMINO GROUPS

BACKGROUND OF THE INVENTION

1. Field of the Invention

The invention relates to a surface-modified solid, to a process for preparing it, and to its use.

2. Background Art

In the surface modification of solids, whether they be pulverulent solids or massive (bulk) solids, a problem which frequently arises is that the modification is not permanent, i.e., the surface modifying agent is not sufficiently anchored onto the surface and is therefore detached and washed off by solvent or a surrounding medium or matrix. This problem can be overcome by firm chemical attachment associated with the formation of chemical bonds. However, this approach has the drawback that, at least as far as known processes are concerned, side reaction products are formed and subsequently eliminated, and disrupt further application. Purification is always associated with increased effort, since it constitutes an additional workstep which increases costs. Moreover, the side reaction products must be disposed of as waste, a costly and environmentally burdensome operation. Added to this is the fact that the purification is usually incomplete, and so unwanted side reaction products still remain on the surface. Additionally, purification, which for technical reasons must take place at a high temperature, imposes a burden on the target product and results in a deterioration in its quality.

Residual amounts of side reaction products are especially deleterious in several application areas. For example, when a pulverulent solid is used as a rheological additive in liquid media such as polymers and resins or resin solutions, as free-flow aids and triboelectric charge control agents in pulverulent systems such as toners, developers, or in pulverulent varnish or coating systems, side reaction products may alter the effects of the additives unpredictably; and when the solid is surface-treated with the aim of improving adhesion or crosslinking with the surrounding medium, side reaction products may alter these properties unpredictably as well.

In U.S. Pat. No. 5,458,916, the addition of alcohols is disclosed as a catalyst for improving the reaction yield of silica with chlorosilanes. This process has the disadvantage that traces of alcohol, as well as the HCl and side reaction products thereof, remain on the metal oxide. In U.S. Pat. No. 3,868,345 and U.S. Pat. No. 3,953,487, metal oxides are silylated with silazanes. With the processes described in these patents, however, traces of ammonia remain on the metal oxide. A disadvantage of these treated metal oxides arises in the course of use as active filler or rheological additive in liquid systems, polymer systems, and resin systems of medium and high polarity. In such systems, problems occur in connection with miscibility and viscosity stability. A further disadvantage is evident when used as additives, e.g., as antiblocking agents, as free-flow aids, or for controlling or regulating triboelectric properties with solids, especially finely divided solids such as crosslinked polymer and resin systems, or finely divided inorganic solids. Problems result with respect to the stability of the system with respect to charge. This causes difficulties when used as free-flow aids and/or charge regulators in pulverulent products such as powder resin systems, powder coatings, or toners and developers.

SUMMARY OF THE INVENTION

It is an object of the invention to provide a surface-modified solid which does not have one or more of the drawbacks of the prior art.

DETAILED DESCRIPTION OF THE PREFERRED EMBODIMENT(S)

The invention provides a process for preparing a solid surface-modified with groups of the general formula I

wherein a solid having OH groups on a surface thereof is reacted with a cyclic silazane of the general formula II

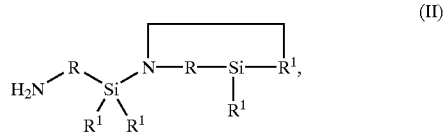

where
R denotes a divalent, optionally cyano- or halogen-substituted $C_3$–$C_{15}$ hydrocarbon radical which is bonded via N—C and C—Si and in which one or more nonadjacent methylene units may be replaced by —O—, —CO—, —COO—, —OCO—, —OCOO—, —S—, or —NR$^x$— and in which one or more nonadjacent methine units may be replaced by —N=, —N=N—, or —P=, there being at least 3 and not more than 6 atoms between the silicon atom and the nitrogen atom in the ring,
$R^x$ denotes hydrogen or a $C_1$–$C_{10}$ hydrocarbon radical which is optionally substituted by —CN or halogen, and
$R^1$ denotes a hydrogen atom or a monovalent $C_1$–$C_{20}$ hydrocarbon radical or $C_1$–$C_{15}$ hydrocarbonoxy radical which is optionally substituted by —CN, —NCO, —NR$^x_2$, —COOH, —COOR$^x$, -halogen, -acryloyl, -epoxy, —SH, —OH or —CONR$^x_2$ and bonded via Si—C, and in each of which one or more nonadjacent methylene units may be replaced by —O—, —CO—, —COO—, —OCO—, —OCOO—, —S—, or —NR$^x$— and in which one or more nonadjacent methine units may be replaced by —N=, —N=N—, or —P=.

Since the reaction takes place without the formation of side reaction products or elimination products from the surface modification, the surface-modified solid contains no such products.

The invention also provides surface-modified solids obtainable by the present process.

The solid having OH groups on the surface can be any such solid; for example, an organic solid such as cellulose; a metal with an oxidized surface such as silicon, aluminum or iron; a mineral glass such as quartz glass or window glass; or a metal oxide.

As the base (parent) product for surface modification it is preferred to use a solid having an average particle size <1000 μm, in particular having an average primary particle size of from 5 to 100 nm. These primary particles may necessarily not exist in isolation but instead may be constituents of larger aggregates and agglomerates. Preferred solids are metal oxides. The metal oxide preferably has a specific surface area of from 0.1 to 1000 m$^2$/g (measured by the BET method in accordance with DIN 66131 and 66132), with particular preference from 10 to 500 m$^2$/g.

The metal oxide may comprise aggregates (defined as in DIN 53206) with diameters in the range from 50 to 1000 nm, agglomerates (as defined in DIN 53206) which are composed of aggregates and which depending on the external shearing load (caused, for example, by the measuring conditions) may have sizes of from 1 to 1000 μm.

For reasons of technical manageability, the metal oxide is preferably an oxide with a covalent bond component in the metal-oxygen bond, preferably an oxide, in the solid aggregate state, of the main and transition group elements, for example those of main group 3, such as boron, aluminum, gallium or indium oxide, or of main group 4, such as silicon dioxide, germanium dioxide, tin oxide or tin dioxide, lead oxide, lead dioxide, or an oxide of transition group 4, such as titanium dioxide, zirconium oxide, or hafnium oxide. Other examples are stable oxides of nickel, cobalt, iron, manganese, chromium or vanadium.

Particular preference is given to aluminum(III), titanium (IV), and silicon(IV) oxides, such as wet-chemically prepared silicas or silica gels, examples being precipitated silicas or silica gels; or aluminum oxides, titanium dioxides or silicon dioxides prepared in high-temperature processes, such as pyrogenically prepared aluminum oxides, titanium dioxides, silicon dioxides, or silica, for example.

Other solids are silicates, aluminates or titanates, or sheet-like aluminum silicates such as bentonites, montmorillonites, smectites or hectorites. Another form of solid which can be used are soot blacks such as lamp blacks or furnace blacks, or soot blacks which can be used as colorants or as reinforcing fillers or as rheological additives, commonly referred to as carbon blacks.

Particular preference is given to pyrogenic silica, which is prepared by flame pyrolysis/hydrolysis from organosilicon compounds, e.g., from silicon tetrachloride or methyl dichlorosilane, or hydrotrichlorosilane or hydromethyldichlorosilane, or other methylchlorosilanes or alkylchlorosilanes, including admixtures with hydrocarbons, or any desired volatilizable or sprayable mixtures of organosilicon compounds, as mentioned, and hydrocarbons, e.g., in a hydrogen-oxygen flame, or else a carbon monoxide-oxygen flame. The silica can be prepared with or without further, optional addition of water, for example in the purification step. Preferably, no water is added. Any desired mixtures of these solids may also be used for the surface modification.

Preferably, the pyrogenic silica has a fractal surface dimension of preferably less than or equal to 2.3, with particular preference less than or equal to 2.1, with especial preference from 1.95 to 2.05, the fractal surface dimension $D_s$ being defined by the relationship: particle surface area A being proportional to particle radius R to the power of $D_s$.

Preferably, the silica has a fractal mass dimension $D_m$ of preferably less than or equal to 2.8, more preferably less than or equal to 2.7, with particular preference from 2.4 to 2.6. The fractal mass dimension $D_m$ is defined by the relationship: Particle mass M is proportional to particle radius R to the power of $D_m$.

Preferably, the silica has a surface silanol group (SiOH) density of less than 2.5 $SiOH/nm^2$, preferably less than 2.1 $SiOH/nm^2$, more preferably less than 2 $SiOH/nm^2$, with particular preference from 1.7 to 1.9 $SiOH/nm^2$.

Silicas prepared by a wet-chemical route or at high temperature (i.e. >1000° C.) can be used. Silicas prepared pyrogenically are particularly preferred. It is also possible to use hydrophilic metal oxides which come freshly prepared direct from the burner, which have been stored prior to use, or which have already been packaged in the commercially customary fashion. It is also possible to use hydrophobicized metal oxides or silicas, e.g., commercially customary silicas.

Either uncompacted silicas, with bulk densities <60 g/l, or compacted silicas, with bulk densities >60 g/l, can be used. Mixtures of different metal oxides or silicas can be used as well, such as mixtures of metal oxides or silicas with different BET surface areas, or mixtures of metal oxides with different degrees of hydrophobicization or silylation.

The metal oxide can be prepared in continuous or batchwise processes, the process of silylation being composed of one or more steps. The silylated metal oxide is preferably manufactured by a process in which preparation takes place in separate steps: (A) first, preparation of the hydrophilic metal oxide, then (B) silylation of the metal oxide, by (1) contacting the hydrophilic metal oxide with cyclic silazane, (2) reaction of the hydrophilic metal oxide with the cyclic silazane, and (3) purification of the hydrophilic metal oxide to remove excess cyclic silazane.

The surface treatment is preferably conducted in an atmosphere which does not result in the oxidation of the silylated metal oxide i.e., which contains preferably less than 10% by volume oxygen, more preferably less than 2.5% by volume. Best results are achieved at less than 1% by volume oxygen.

Coating, reaction, and purification may be carried out in the form of a batchwise or continuous process. For technical reasons, a continuous reaction regime is preferred.

The coating takes place preferably at temperatures of −30° C.–250° C., more preferably 20° C.–150° C., most preferably 20° C.–80° C.; preferably, the coating step is cooled to 30–50° C. The residence time is 1 min–24 h, preferably from 15 min to 240 min, and, for reasons of the space/time yield, most preferably from 15 min to 90 min.

The pressure during coating may advantageously range from a slight underpressure down to 0.2 bar up to an overpressure of 100 bar, with preference being given for technical reasons to standard pressure, in other words "pressureless" operation in relation to external/atmospheric pressure.

Cyclic silazane is preferably added as a liquid and in particular is admixed onto the pulverulent metal oxide. This is preferably done by means of nozzle techniques or comparable techniques, including effective atomization techniques such as atomization in 1-fluid nozzles under pressure (preferably from 5 to 20 bar), spraying with 2-fluid nozzles under pressure (preferably gas and liquid 2–20 bar), ultrafine dispersion with atomizers or gas-solid exchange equipment with moving, rotating or static internals, which permit homogeneous distribution of the cyclic silazane with the pulverulent metal oxide. Preferably, the cyclic silazane is added in the form of a very fine aerosol, the aerosol preferably having a settling velocity of 0.1–20 cm/s. The loading of the metal oxide and the reaction with the cyclic silazane preferably take place with mechanical or gasborne fluidization. Mechanical fluidization is particularly preferred. A gasborne fluidization may be effected by means of any inert gases which do not react with the cyclic silazane, the metal oxide, or the silylated metal oxide, i.e., which do not lead to side reactions, degradation reactions, oxidation processes or flame and/or explosion phenomena. The inert gases are preferably $N_2$, Ar, other noble gases, $CO_2$, etc. The gases are preferably supplied for fluidization at superficial gas velocities preferably in the range from 0.05 to 5 cm/s, with particular preference 0.5–2.5 cm/s.

Particular preference is given to mechanical fluidization, operated without additional gas beyond that used for inertization, by means of paddle stirrers, anchor stirrers, and other suitable stirring elements.

In one particularly preferred embodiment, unreacted cyclic silazane and off gases from the purification step are recycled to the step of coating and loading of the metal oxide. This recycling may be partial or complete, preferably comprising 10 to 90% of the entire volume flow of the gas volumes emerging from the purification process.

Recycle preferably takes place in suitably heat-conditioned apparatus. Recycling preferably takes place preferably in an uncondensed phase, i.e., as a gas or as a vapour, for example as mass transport assisted by pressure compensation or as controlled mass transport with conventional gas transport systems, such as ventilators and pumps, including compressed air membrane pumps. Since recycling of the uncondensed phase is preferred, it may be advisable to heat the recycle lines if necessary. Recycling of unreacted cyclic silazane and offgases may amount to between 5 and 100% by weight, based on their total mass, preferably between 30 and 80% by weight. Based on 100 parts of fresh cyclic silazane used, recycling may amount to between 1 and 200 parts, preferably from 10 to 30 parts. The recycling of the purification off-products of the silylating reaction to the coating stage is preferably continuous.

The reaction takes place preferably at temperatures 40° C.–200° C., more preferably 40° C.–160° C., and most preferably at 80° C.–120° C. The reaction time is from 5 min to 48 h, preferably from 10 min to 4 h.

Optionally, it is possible to add protic solvents such as liquid or vaporizable alcohols or water. Typical alcohols are isopropanol, ethanol, and methanol. Mixtures of the above-mentioned protic solvents may also be added. It is preferred to add from 1 to 50% by weight of protic solvent, based on the metal oxide, with particular preference from 5 to 25%. Water is particularly preferred. Optionally, acidic catalysts, acidic in the sense of a Lewis acid or a Brönsted acid, such as hydrogen chloride; or basic catalysts, basic in the sense of a Lewis base or a Brönsted base, such as ammonia, can be added. These catalysts are preferably added in trace amounts, i.e., less than 1000 ppm. With particular preference, no catalysts are added.

Purification preferably takes place at a purifying temperature of from 20° C. to 200° C., more preferably from 50° C. to 150° C., most preferably from 50 to 120° C. The purifying step preferably features movement, with slow movement and slight mixing being particularly preferred. The stirring elements are advantageously provided and moved in such a way that mixing and fluidization, take place without complete vortexing.

The purifying step may additionally feature increased gas input, corresponding to a superficial gas velocity of from 0.001 to 10 cm/s, preferably from 0.01 to 1 cm/s. This gas velocity can be effected using any inert gases which do not react with the cyclic silazane, the metal oxide, or the silylated metal oxide, i.e., which do not lead to side reactions, degradation reactions, oxidation processes, or flame and explosion phenomena; preferred gases are $N_2$, Ar, other noble gases, $CO_2$, etc.

Additionally, during the silylation or following the purification, processes for mechanical compaction of the metal oxide may be employed, such as, for example, press rolls, milling units such as etch continuous or batchwise runner mills and ball mills, compaction by means of screws or screw mixers, screw compactors, briquetting machines, or compaction by removal of air or gas under vacuum by means of appropriate vacuum methods.

Particular preference is given to mechanical compaction during silylation in step (II) of the reaction by means of press rolls, milling equipment referred to above such as ball mills, compaction by screws, screw mixers, screw compactors, or briquetting machines.

In another particularly preferred procedure, purification is followed by the deployment of processes for mechanical compaction of the metal oxide such as compaction by removal of the air or gas component under suction, by means of appropriate vacuum methods, or press rolls, or combinations of both processes. Additionally, in one particularly preferred procedure, purification can be followed by the deployment of processes for deagglomerating the metal oxide, such as pinned-disk mills or devices for milling/classifying, such as pinned-disk mills, hammer mills, countercurrent mills, or impact mills.

The cyclic silazane is used preferably in an amount of more than 1% by weight based on the metal oxide, more preferably more than 3% by weight, most preferably more than 10% by weight, for a metal oxide surface area of 100 $m^2/g$ BET surface area measured by the BET method in accordance with DIN 66131 and 66132.

In the cyclic silazane of the general formula II, R is aliphatically saturated or unsaturated, aromatic, straight-chain or branched. R is preferably an unbranched $C_3$–$C_6$ alkylene radical which may be substituted by halogen atoms, especially fluorine and chlorine. There are preferably 3 atoms between the silicon atom and the nitrogen atom in the ring. In particular, R is a propylene radical.

The $C_1$–$C_{20}$ hydrocarbon radicals and $C_1$–$C_{20}$ hydrocarbonoxy radicals $R^1$ may be aliphatically saturated or unsaturated, aromatic, straight-chain or branched. $R^1$ has preferably from 1 to 12 atoms, in particular from 1 to 6 atoms, preferably only carbon atoms in the hydrocarbon (oxy) chain, or one alkoxy oxygen atom and otherwise only carbon atoms. Preferably, $R^1$ is a straight-chain or branched $C_1$–$C_6$ alkyl radical. Methyl, ethyl, phenyl, vinyl, and trifluoropropyl are radicals particularly preferred.

A silazane of the general formula II may be prepared by a process in which haloalkyldialkylchlorosilane of the general formula III

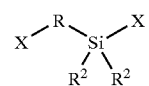
(III)

or a bishaloalkyltetraalkyldisilazane of the general formula IV

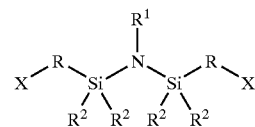
(IV)

or a mixture of compounds of the general formula III and IV, where
X denotes F, Cl, Br or I,
$R^2$ is as defined for $R^1$, and
$R^1$ and R are as defined above,
is/are reacted with ammonia, preferably under pressure.

In addition to the cyclic silazane of the general formula II, the solid may be reacted with common surface modifiers, especially silylating agents.

The invention likewise provides a process for preparing a surface-modified solid, wherein a solid having OH groups on the surface is reacted with amino-functional organosiloxane of the general formula V

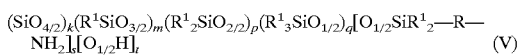  (V)

which is obtainable by reacting organosiloxane of the general formula VI

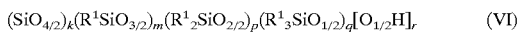  (VI)

with cyclic silazane of the above general formula II, where
R and $R^1$ are as defined for the general formula II and
s is an integer of least 1,
r is an integer of at least 1,
s+t denote the value of r, and
k+m+p+q denote values of at least 2, these values subject to being non-integral values in the aggregate, i.e. on average.

Preference is given to using the compounds of the general formula V in which R denotes a propylene radical and $R^1$ denotes methyl, ethyl, phenyl, vinyl or trifluoropropyl radical.

The amino-functional organosiloxane of the general formula V may be linear, cyclic or branched. The sum of k, m, p, q, s and t is preferably a number from 2 to 20,000, in particular from 8 to 1000. In order for a reaction between the organosiloxane of the general formula VI and the silazane to be possible, r must be >0, i.e., the organosiloxane of the general formula VI must contain hydroxyl groups.

One preferred variant of a branched organosiloxane of the general formula V is an organosilicone resin. This resin may be composed of a plurality of units, as indicated in the general formula V, the molar percentages of the units present being indicated by the indices k, m, p, q, r, s and t. Preference is given to a figure of from 0.1 to 20% of units r, based on the sum of k, m, p, q and r. At the same time, however, k+m must also be >0. In the case of the organosiloxane resin of the general formula V, s must be >0 and s+t must be equal to r. Preference is given in this context to resins wherein 5%<k+m<90%, based on the sum of k, m, p, q, r, s and t, and preferably t is 0. In one particularly preferred case, the radical R is a propylene radical and $R^1$ is a methyl radical.

If it is desired here to prepare resins having only a specific amine content, then the stoichiometric proportions between resin and cyclic silazane are chosen so as to give the desired amine content; residual Si—OH groups may then remain in the product where appropriate.

Another preferred variant of an amino-functional organosiloxane of the general formula V is a linear organosiloxane of the general formula VII,

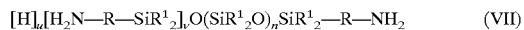

$$[H]_u[H_2N-R-SiR^1{}_2]_vO(SiR^1{}_2O)_nSiR^1{}_2-R-NH_2 \quad (VII)$$

prepared from an organosiloxane of the following general formula VIII

$$HO(R^1{}_2SiO)_nR^1{}_2SiOH \quad (VIII)$$

by reaction with a cyclic silazane of the above general formula II, where
u denotes the values 0 or 1,
v denotes the values 1−u, and
n denotes a number from 1 to 20 000.
Preferably, u has the value 0, and n preferably has values from 1 to 20 000, in particular from 8 to 2000. If a mixture of starting compounds of the general formula VIII is used, the value of n refers to the average degree of polymerization of the silanols of the general formula VIII that are present.

The linear organosiloxanes of the general formula VII that are prepared in this way may be characterized essentially by 3 different parameters:
1. viscosity (or molecular weight)
2. amine content
3. degree of amino functionality of the end groups.

Of these parameters, however, in the case of linear organosiloxanes of the general formula VII, only two parameters can generally be varied independently of one another; that is, for a given viscosity and functionality, the amine content is fixed. For a given amine content and viscosity, the functionality is fixed, and for a given amine content and functionality, the viscosity is fixed.

If it is desired to prepare linear organosiloxane of the general formula VII in which the degree of functionalization plays no part, i.e., in the case of silicone oils which need not have a functionality of 2, but are instead defined only by total amine content and viscosity, then the silicone component chosen may be an organosiloxane of the formula VIII which gives the end product the desired viscosity and for functionalization, a cyclic silazane of the general formula V may be used, in an amount intended to correspond to the amine content of the end product.

Furthermore, the compounds of the general formula VII have the advantage that, if u is >0, they can be condensed either with themselves or with compounds of the general formula VIII, where appropriate with the aid of a catalyst, in order to prepare compounds of the general formula VII with a higher molecular weight; in other words, the numerical value of the number n rises. In one particularly preferred case, n represents a number from 15 to 50 prior to condensation and a higher number from 50 to 2000 after condensation.

In the process for preparing amino-functional organosiloxanes of the general formula V, the amount of silazane(s) of the general formula III used is dependent on the amount of silanol groups to be functionalized. If, however, it is desired to bring about complete functionalization of the OH groups, then the silazane should be added in at least equimolar amounts. Where the cyclic silazane is used in excess, the unreacted silazane can subsequently be removed, for example by distillation or by hydrolysis optionally followed by stripping.

The preparation of amino-functional organosiloxane of the general formula V is preferably conducted at from 0° C. to 100° C., with particular preference from at least 10° C. to at least 40° C. The process can be carried out either with or without the use of solvents in suitable reactors, at any convenient pressure, for example, under vacuum, under increased pressure or at normal pressure (0.1 MPa).

When using solvents, inert solvents, especially aprotic solvents such as aliphatic hydrocarbons, e.g., heptane or decane, and aromatic hydrocarbons, e.g., toluene or xylene, are preferred. It is likewise possible to use ethers such as THF, diethyl ether or MTBE. The amount of solvent should be sufficient to ensure sufficient homogenization of the reaction mixture. Solvents or solvent mixtures having a boiling point or boiling range of up to 120° C. at 0.1 MPa are preferred.

If the amount of silazane of the general formula III added to the organosiloxane of the general formula VI is substoichiometric, residual unreacted Si—OH groups may remain in the amino-functional organosiloxane of the general formula V or reacted with other silazanes, for example those of the following general formula IX:

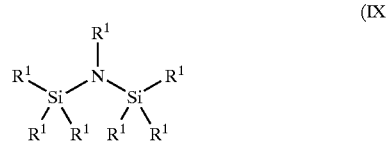

(IX)

This reaction provides amino-functional organosiloxane of the general formula X:

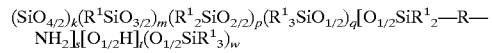

$$(SiO_{4/2})_k(R^1SiO_{3/2})_m(R^1{}_2SiO_{2/2})_p(R^1{}_3SiO_{1/2})_q[O_{1/2}SiR^1{}_2-R-NH_2]_s[O_{1/2}H]_t(O_{1/2}SiR^1{}_3)_w$$

In this formulae, R, $R^1$, k, m, p, q and s are as defined above, t is greater than or equal to 0, w is greater than 0, and s+t+w=r, r being defined as in the general formula VI above. Silazanes of the general formula IX can be used simultaneously with cyclic silazane of the general formula II or can be used after the reaction of the silazane of the general formula II.

Where linear organosiloxanes of the above general formula VIII are reacted both with silazanes of the general formula II and with silazanes of the general formula IX, compounds of the general formula XI

$$[R^1{}_3Si]_u[H_2N-R-SiR^1{}_2]_vO(SiR^1{}_2O)_nSiR^1{}_2-R-NH_2 \quad (XI)$$

are obtained in which $R^1$, R, and n are as defined above and, on average, u>0, v<1, and u+v=1.

Preference is given to preparing a modified silica with a homogeneously modified surface, preferably having an average primary particle size of 100 nm or less, more preferably from 5 to 50 nm, these primary particles not existing in isolation in the silica but instead being constituents of larger aggregates (as defined in DIN 53206) which have a diameter of from 50 to 1000 nm and make up agglomerates (as defined in DIN 53206) which depending on an external shearing load have sizes of from 1 to 500 µm. Preferred silica has a specific surface area of from 10 to 300 $m^2/g$ (measured by the BET method in accordance with DIN 66131 and 66132); a fractal mass dimension $D_m$ of less than or equal to 2.8, preferably less than or equal to 2.7, more preferably from 2.4 to 2.6; and a surface silanol group (SiOH) density preferably less than 0.4 $SiOH/nm^2$, more preferably less than 0.25 $SiOH/nm^2$, and most preferably less than 0.15 $SiOH/nm^2$, and per 100 $m^2/g$ specific surface area, a carbon content of at least 1.0% by weight, preferably more than 1.5% by weight.

A further feature of the surface-modified metal oxide is that it has a high thickening action in polar systems such as solvent-free polymers and resins, as well as solutions, suspensions, emulsions, and dispersions of organic resins in aqueous systems or organic solvents (e.g.: polyesters, vinyl esters, epoxy, polyurethane, alkyd resins, etc.), and is therefore suitable as a rheological additive for these systems.

A further feature of the surface-modified metal oxide is that it has a low thickening action in apolar systems, such as uncrosslinked silicone rubber, while yet having a high reinforcing action in the crosslinked silicone rubbers, and is therefore outstandingly suitable as a reinforcing filler for silicone rubbers.

A further feature of the surface-modified metal oxide is that in pulverulent systems it prevents caking or clumping, for example, under the influence of moisture, but also does not tend toward reagglomeration, and hence toward unwanted separation, instead maintaining flowability of the powder, permitting load-stable and storage-stable mixtures. This applies in particular to its use in nonmagnetic and magnetic toners, and in developers and charge control agents, e.g., in contactless or electrophotographic printing/reproduction processes, which may be 1-component or 2-component systems. This is also the case in pulverulent resins used as coating systems; i.e. powder coatings.

The invention further pertains to the use of the metal oxide in systems of low to high polarity as a viscosity-imparting component. This relates to all solvent-free, solvent-containing, water-thinnable, film-forming coating compositions, rubberlike to hard coatings, adhesives, sealants and casting compositions, and other comparable systems.

Surface modified metal oxides can be used in systems such as epoxy systems, polyurethane (PU) systems, vinyl ester resins, unsaturated polyester resins, water-soluble and water-dispersible resin systems, low-solvent, high-solids resin systems, solvent-free resins which are applied in powder form, for example, as coating materials.

As a rheological additives to these systems, the metal oxides provide the required viscosity, pseudoplasticity, thixotropy, and yield point sufficient for standing ability on vertical faces.

The metal oxide can be used especially as a rheological additive and reinforcing filler in noncrosslinked and crosslinked silicone systems, such as silicone elastomers which are composed of silicone polymers such as polydimethylsiloxanes, fillers, and further additives. These systems may be crosslinked with peroxides, for example, or by way of addition reactions, (hydrosilylation) between olefinic groups and Si—H groups, or by condensation reactions between silanol groups, examples being moisture-cured systems.

The invention additionally provides toners, developers, and charge control agents which comprise the surface-modified metal oxide. Examples of such developers and toners are magnetic 1-component and 2-component toners, as well as nonmagnetic toners. These toners may be composed of resins such as styrene resins and acrylic resins, preferably ground to particle distributions of 1–100 µm, or may be resins which have been prepared in polymerization processes in dispersion, emulsion, solution, or in bulk, with particle distributions of preferably 1–100 µm. Metal oxide is preferably used for improving and controlling the flow behavior of powders, and/or for regulating and controlling the triboelectric charge properties of toners or developers. Such toners and developers are preferably used in electrophotographic printing processes, but can also be employed in direct image transfer processes.

A typical toner composition is as follows:

Solid resin as binder, sufficiently hard to prepare a powder therefrom, preferably having a molecular weight of more than 10,000, preferably containing less than 10% of polymers with a molecular weight below 10,000, e.g., a polyester resin which may be a cocondensate of diol and carboxylic acid, carboxylic ester or carboxylic anhydride, e.g., having an acid number of 1–1000, preferably 5–200, or a polyacrylate or a polystyrene, or mixtures or copolymers thereof; and having an average particle diameter of less than 20 µm, preferably less than 15 µm, with particular preference to less than 10 µm. The toner resin may comprise alcohols, carboxylic acids, and polycarboxylic acids.

Colorants customary in the art, such as black soot, pigment-grade carbon black, cyan dyes, magenta dyes, and yellow dyes.

Typically, positive charge control agents, for example charge control additives, of the nigrosine dye type or triphenylmethane dyes substituted by tertiary amines, or quaternary ammonium salts such as CTAB (cetyltrimethylammonium bromide, or hexadecyltrimethylammonium bromide), or polyamines, typically less than 5% by weight.

Optionally, negative charge control agents including charge control additives such as metal-containing azo dyes, copper phthalocyanine dyes, or metal complexes of alkylated salicylic acid derivatives or benzoic acid, especially boron or aluminum complexes, in the requisite amounts, typically less than 5% by weight.

If desired, for the preparation of magnetic toners, it is possible to add magnetic powders such as powders which can be magnetized in a magnetic field, for example ferromagnetic substances such as iron, cobalt, nickel, various alloys, or compounds such as magnetite, hematite or ferrite.

Optionally, it is also possible to add developers, such as iron powders, glass powders, nickel powders, or ferrite powders.

Metal oxide in amounts, based on a solid binder as resin with an average particle diameter of 20 µm, of preferably more than 0.01% by weight, more preferably more than 0.1% by weight. As the average particle diameter of the binder goes down, larger amounts of metal oxide are generally required, with the required amount of metal oxide increasing in inverse proportion to the particle diameter of the binder. In each case, however, the metal oxide content is preferably less than 5% by weight based on binder resin.

Further inorganic additives, such as finely divided or coarse silicon dioxide, including that with average diameters of from 100 to 1000 nm, aluminum oxides such as pyrogenic aluminum oxide, titanium dioxide such as pyrogenic anatase or rutile, or zirconium oxide.

Waxes, such as paraffinic waxes having 10–500 carbon atoms, silicone waxes, olefinic waxes, preferably waxes having an iodine number <50, preferably <25, and a hydrolysis number of 10–1000, preferably 25–300.

The toner can be used in various developing processes, such as for electrophotographic image production and reproduction such as magnetic brush processes, cascade processes, use of conductive and nonconductive magnetic systems, powder cloud processes, development in impression, and others.

The use of the cyclic silazane produces, in particular, the following advantages:

- high reaction yields—hence being economical and sparing of resources
- higher degree of silylation for minimal use of silylating agent
- silylation in the absence of catalysts, which for process-related reasons often have to remain in the product, and which might adversely affect the quality and performance of the end product
- improved image quality from using the toner prepared with the metal oxide
- extended lifetime in high performance (e.g., high image dot density) of toners prepared with the metal oxide.

All of the symbols in the above formulae are defined in each case, independently of one another. Unless stated otherwise, in the examples below all amounts and percentages are by weight, all pressures are 0.10 MPa (abs.), and all temperatures are 20° C.

EXAMPLES

Example 1

In a continuous apparatus at a temperature of 30° C. under $N_2$ inert gas, 50 g/h of deionized water in very finely divided form are introduced through a nozzle to a mass flow of 1000 g/h of hydrophilic silica having a moisture content <1%, an HCl content <100 ppm, and a specific surface area of 130 $m^2$/g (measured by the BET method in accordance with deionized N 66131 and 66132) (available under the name WACKER HDK S13 from Wacker-Chemie GmbH, Munich, Germany). 22.5 g/h of a cyclic silazane of the general formula II in which $R^1$ denotes a —$CH_3$ group and R a —$CH_2$—$CH_2$—$CH_2$— group are added as a liquid in very finely divided form by atomization through a one-fluid nozzle (pressure 10 bar). The silica thus loaded with cyclic silazane is further fluidized by means of stirring, with a residence time of 2 hours at a temperature of 30° C., and is then reacted in a reactor at 100° C. with a residence time of 2 hours, yielding a white hydrophobic Silica powder with a homogeneous coat of silylating agent. The analytical data are set out in table 1.

Example 2

In a continuous apparatus at a temperature of 30° C. under $N_2$ inert gas, 50 g/h of Deionized water in very finely divided form are introduced through a nozzle to a mass flow of 1000 g/h of hydrophilic silica, having a moisture content <1%, an HCl content <100 ppm, and a specific surface area of 130 $m^2$/g (measured by the BET method in accordance with DIN 66131 and 66132) (available under the name WACKER HDK S13 from Wacker-Chemie GmbH, Munich, Germany). 45 g/h of a cyclic silazane of the general formula II in which $R^1$ denotes a —$CH_3$ group and R a —$CH_2$—$CH_2$—$CH_2$— group are added in liquid, very finely divided form by atomization through a one-fluid nozzle (pressure 10 bar). The silica thus loaded with cyclic silazane is further fluidized by means of stirring, with a residence time of 2 hours at a temperature of 30° C. and is then reacted in a reactor at 100° C. with a residence time of 2 hours, yielding a white hydrophobic Silica powder with a homogeneous coat of silylating agent. The analytical data are set out in table 1.

Example 3

In a continuous apparatus at a temperature of 30° C. under $N_2$ inert gas, 50 g/h of Deionized water in very finely divided form are introduced through a nozzle to a mass flow of 1000 g/h of hydrophilic silica having a moisture content <1%, an HCl content <100 ppm, and a specific surface area of 130 $m^2$/g (measured by the BET method in accordance with DIN 66131 and 66132) (available under the name WACKER HDK S13 from Wacker-Chemie GmbH, Munich, Germany). 135 g/h of an OH-terminal polydimethylsiloxane having a viscosity at 25° C. of 40 mPas and an OH content of 4% by weight, and 45 g/h of a cyclic silazane of the general formula II in which $R^1$ denotes a —$CH_3$ group and R a —$CH_2$—$CH_2$—$CH_2$— group are added in liquid, very finely divided form by atomization through a one-fluid nozzle (pressure 10 bar). The Silica thus loaded is further fluidized by means of stirring with a residence time of 2 hours at a temperature of 30° C. and is then reacted in a reactor at 100° C. with a residence time of 2 hours. This gives a white hydrophobic Silica powder with a homogeneous coat of silylating agent. The analytical data are set out in table 1.

Example 4

At a temperature of 30° C. under $N_2$ inert gas, 5 g/h of deionized water in very finely divided form are introduced through a nozzle to 100 g of hydrophilic silica, having a moisture content <1%, an HCl content <100 ppm, and a specific surface area of 130 $m^2$/g (measured by the BET method in accordance with DIN 66131 and 66132) (available under the name WACKER HDK S13 from Wacker-Chemie GmbH, Munich, Germany). 2.25 g of a cyclic silazane of the general formula II in which $R^1$ is a —$CH_3$ group and R is a —$CH_2$—$CH_2$—$CH_2$— group are added by atomization through a one-fluid nozzle (pressure: 5 bar). The silica thus loaded with cyclic silazane is fluidized further by means of stirring with a residence time of 2.5 hours at a temperature of 30° C., and then reacted at 100° C. in a 100 l drying cabinet under $N_2$. The analytical data are set out in table 1.

TABLE 1

Analytical data of the Silica of examples 1 to 4

| Example | % C | BET | pH |
|---|---|---|---|
| 1 | 1.2 | 106 | 10.1 |
| 2 | 2.1 | 98 | 10.3 |
| 3 | 4.9 | 81 | 9.9 |
| 4 | 5.0 | 79 | 10.0 |

Description of the Analytical Methods:

1. Carbon content (% C)

Elemental analysis for carbon; combustion of the sample at >1000° C. in a stream of $O_2$, detection and quantification of the resulting $CO_2$ by IR; instrument: LECO 244.

2. BET

Measured by the BET method in accordance with DIN 66131 and 66132.

3. pH

4% (by weight) suspension of the silica in saturated aqueous sodium chloride solution:methanol=50:50

Example 5

Charge Behavior of the Silica 50 g portions of a ferrite carrier having an average particle diameter of 80 μm are mixed with 0.5 g portions of the Silicas from examples 3 and 4 at room temperature by shaking in a 100 ml PE vessel for 15 minutes. Prior to measurement, these mixtures are activated on a roller bed for 5 minutes at 64 rpm in a sealed 100 ml PE vessel. Using a "hard-blow-off cell" (approximately 3 g of Silica, capacity 10 nF, 45 μm screen, air flow 1 l/min, air pressure 2.4 kPa, measurement time 90 s) (EPPING GmbH, D-85375 Neufahrn), the triboelectric charging behavior of the Silica is measured as the ratio of Silica charge to Silica mass (q/m).

TABLE 2

| Example | Charge behavior q/m against ferrite [μC/g] |
|---|---|
| Carrier + example 1 | +80 |
| Carrier + example 2 | +250 |
| Carrier + example 3 | +100 |
| Carrier + example 4 | +110 |

Example 6

Flow and Charge Behavior of Silica Toner 100 g of a Silica-free magnetic 1-component dry toner of negatively charging "crushed" type, based on styrene-methacrylate copolymer, with an average particle size of 14 μm are mixed with 0.4 g of a Silica according to examples 3–4 in a tumble mixer (e.g., Turbular TM) at room temperature for 1 hour. After a toner exposure time of 20 minutes (corresponding to the loading experienced after 1000 copying operations), the charging (charge per mass) of the ready-produced Silica toner and the flow behavior (mass flow) of the ready-produced Silica toner to the developing roller are measured in a "q/m mono" electrometer/flow tester (EPPING GmbH, D-85375 Neufahrn).

TABLE 3

| Example | Toner charge [μC/g] | Flow behavior [mg] |
|---|---|---|
| Silica-free toner | +0.50 | 2 |
| Toner + example 1 | +2.3 | 36 |

TABLE 3-continued

| Example | Toner charge [μC/g] | Flow behavior [mg] |
|---|---|---|
| Toner + example 2 | +2.8 | 45 |
| Toner + example 3 | +3.0 | 48 |
| Toner + example 4 | +2.8 | 47 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. The terms "a" and "an" mean "one or more" unless indicated otherwise.

What is claimed is:

1. A process for preparing a solid surface-modified with groups of the general formula I $$SiR^1{}_2\text{---}R\text{---}NH_2 \quad (I),$$

wherein a solid having OH groups on a surface is reacted with a cyclic silazane of the formula II

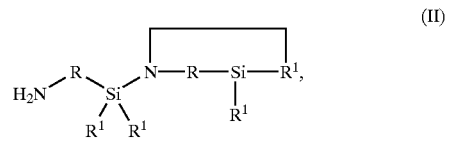

(II)

where

R denotes a divalent, optionally cyano- or halogen-substituted $C_3$–$C_{15}$ hydrocarbon radical which is bonded via N—C and C—Si bonds and in which one or more nonadjacent methylene units may be replaced by —O—, —CO—, —COO—, —OCO—, —OCOO—, —S—, or —NR$^x$— and in which one or more nonadjacent methine units may be replaced by —N=, —N=N—, or —P=, there being at least 3 and not more than 6 atoms between the silicon atom and the nitrogen atom in the ring, $R^x$ denotes hydrogen or a $C_1$–$C_{10}$ hydrocarbon radical which is optionally substituted by —CN or halogen, and $R^1$ denotes a hydrogen atom or a monovalent $C_1$–$C_{20}$ hydrocarbon radical or $C_1$–$C_{15}$ hydrocarbonoxy radical which is optionally substituted by —CN, —NCO, —NR$^x{}_2$, —COOH, —COOR$^x$, -halogen, -acryloyl, -epoxy, —SH, —OH or —CONR$^x{}_2$ and bonded via an Si—C bond, in each of which one or more nonadjacent methylene units may be replaced by —O—, —CO—, —COO—, —OCO—, —OCOO—, —S—, or —NR$^x$— and in which one or more nonadjacent methine units may be replaced by —N=, —N=N—, or —P=.

2. A process for preparing a surface-modified solid wherein a solid having OH groups on a surface thereof is reacted with an amino-functional organosiloxane of the formula V $$(SiO_{4/2})_k(R^1SiO_{3/2})_m(R^1{}_2SiO_{2/2})_p(R^1{}_3SiO_{1/2})_q[O_{1/2}SiR^1{}_2\text{---}R\text{---}NH_2]_s[O_{1/2}H]_r \quad (V)$$

obtained by reacting an organosiloxane of the formula VI $$(SiO_{4/2})_k(R^1SiO_{3/2})_m(R^1{}_2SiO_{2/2})_p(R^1{}_3SiO_{1/2})_q[O_{1/2}H]_r \quad (VI)$$

with a cyclic silazane of the formula II, where s is at least 1, r is at least 1, s+t defines the value of r, and k+m+p+q is of at least 2.

3. The process of claim 1, wherein R is an unbranched $C_3$–$C_6$ alkylene radical.

4. The process of claim 2, wherein R is an unbranched $C_3$–$C_6$ alkylene radical.

5. The process of claim 1, wherein $R^1$ independently is methyl, ethyl, phenyl or vinyl.

6. The process of claim 2, wherein $R^1$ independently is methyl, ethyl, phenyl or vinyl.

7. The process of claim 1, wherein said solid comprises a metal oxide having a specific surface area of from 0.1 to 1000 $m^2/g$.

8. The process of claim 1, wherein said solid comprises pyrogenic silica.

9. A surface-modified metal oxide prepared by the process of claim 1.

10. In a pulverulent system wherein a surface-treated oxide is a system ingredient, the improvement comprising substituting the surface-modified metal oxide of claim 9 for at least a portion of said surface treated metal oxide.

11. In a low to high polarity composition wherein a surface-treated metal oxide is added to increase the viscosity of said composition, the improvement comprising substituting the surface-modified metal oxide of claim 9 for at least a portion of said surface-treated metal oxide.

12. In a toner, developer, or charge control agent, the improvement comprising adding the surface-modified metal oxide of claim 9 to said toner, developer, or charge control agent.

13. A toner, developer or charge control agent comprising the surface-modified metal oxide of claim 9.

* * * * *